United States Patent [19]

Pederson et al.

[11] 4,011,972

[45] Mar. 15, 1977

[54] CONTINUOUS FLOW CENTRIFUGE APPARATUS

[75] Inventors: Victor V. Pederson, Los Altos; Herschel E. Wright, Santa Clara, both of Calif.

[73] Assignee: Beckman Instruments, Inc., Fullerton, Calif.

[22] Filed: Oct. 28, 1975

[21] Appl. No.: 626,551

[52] U.S. Cl. .............................. 233/1 A
[51] Int. Cl.² ........................... B04B 15/00
[58] Field of Search .......... 233/1 R, 3, 11, 16, 233/19 R, 27, 23 R, 28, 1 A

[56] References Cited
UNITED STATES PATENTS

| | | | |
|---|---|---|---|
| 2,067,273 | 1/1937 | Knowles et al. | 233/28 |
| 3,129,174 | 4/1964 | Pickels et al. | 233/11 |
| 3,191,856 | 6/1965 | Pickels et al. | 233/3 |
| 3,195,809 | 7/1965 | Pickels et al. | 233/23 R |
| 3,498,532 | 3/1970 | Harbott | 233/23 R |
| 3,602,425 | 8/1971 | Schmidt | 233/1 A |
| 3,765,601 | 10/1973 | Gulley | 233/1 A |

*Primary Examiner*—George H. Krizmanich
*Attorney, Agent, or Firm*—R. J. Steinmeyer; F. L. Mehlhoff; W. H. May

[57] ABSTRACT

A vacuum seal for use in a continuous flow centrifuge apparatus for minimizing heat transfer from the vacuum bushing to the rotary transfer tube which is conducting the sample solution to the centrifuge rotor. An elongate, cylindrical sleeve surrounds the transfer tube, coaxial therewith and spaced therefrom, adjacent the upper end thereof, between the transfer tube and the vacuum bushing, the bushing creating an oil film around the transfer tube to provide the vacuum seal, the annulus formed between the inner surface of the sleeve and the outer surface of the transfer tube isolating the transfer tube from the heat created in the oil film.

4 Claims, 2 Drawing Figures

CONTINUOUS FLOW CENTRIFUGE APPARATUS

BACKGROUND OF THE INVENTION

1. Field of the Invention

The present invention relates to continuous flow centrifuge apparatus and, more particularly, to apparatus for minimizing heat transfer from a vacuum bushing to a sample in a continuous flow centrifuge apparatus.

2. Description of the Prior Art

Continuous flow or zonal centrifugation has become an increasingly important analytical tool in the investigation of the nature of numerous biological and other chemical substances. A typical continuous flow centrifuge apparatus includes an outer housing defining a vacuum chamber which serves to enclose a rotor and a drive means therefor. The top of the outer housing supports an inlet/outlet assembly for conducting a sample solution to and from a rotary transfer tube which is connected to the rotor. A vacuum seal is formed around the transfer tube, thereby sealing the chamber.

Typically, in continuous flow centrifugation, a sample solution is continuously pumped, via the transfer tube, through the rotor cavity, which is filled with an appropriate density gradient solution. During centrifugation, the particles of interest disperse in a radial direction throughout the density gradient solution and, at equilibrium, are suspended in the solution at a location wherein their respective buoyant densities correspond to that of the solution. When equilibrium is reached, the particles of interest are removed from the rotor by displacing from the rotor cavity the density gradient solution containing the centrifuge particles by means of a liquid having a density greater than the highest density portion of the density gradient solution. A complete, continuous flow centrifuge apparatus including a method for removing the particles of interest from the rotor cavity is disclosed in U.S. Pat. No. 3,498,531 for Continuous Flow Ultracentrifuge and assigned to Beckman Instruments, Inc., the assignee of the present application.

Typically, the vacuum seal around the rotary transfer tube is created by an oil-filled bushing surrounding the transfer tube for creating an oil film between the outer surface of the transfer tube and the inner surface of the bushing. Because of the extremely high speeds involved in centrifugation, the oil film is heated substantially and a continuous flow water cooling system is provided for dissipating the heat transferred from the oil film to the bushing. Unfortunately, the heat generated within the oil film is also transferred to the rotary transfer tube causing heating of same, as well as heating of the sample solution flowing therethrough. However, many biological samples are adversely affected by heat, limiting the usefulness of continuous flow centrifugation.

SUMMARY OF THE INVENTION

According to the present invention, this problem is solved in a manner unknown heretofore. The present improvement in a continuous flow centrifuge apparatus minimizes heat transfer from the vacuum bushing to the transfer tube. With the present apparatus, the vacuum bushing creates an oil film which is spaced from the transfer tube by an annular area which is in a vacuum, thereby minimizing heat radiation thereacross. The surface which is in contact with the oil film is physically connected to the transfer tube along a relatively small area, further minimizing heat transfer therebetween. By reducing significantly the heat transfer from the vacuum sealing surface to the sample solution, continuous flow centrifuge apparatus may be used with a wider variety of biological samples.

Briefly, the present invention is for use in a continuous flow centrifuge apparatus of the type including a housing defining a vacuum chamber, a rotor positioned in the vacuum chamber, a rotary transfer tube connected to the rotor for conducting a sample to and from the rotor, a stationary inlet/outlet assembly connected to the housing for conducting the sample to and from the rotary transfer tube, and a bushing surrounding the transfer tube for creating an oil film to provide a vacuum seal around the transfer tube. The improvement comprises an elongate, cylindrical sleeve surrounding, spaced from, and coaxial with the transfer tube, adjacent the upper end thereof, positioned between the transfer tube and the bushing, the upper end of the sleeve including a stem connected to the upper end of the transfer tube, the oil film being created between the bushing and the outer surface of the sleeve, whereby the vacuum annulus formed between the inner surface of the sleeve and the outer surface of the transfer tube minimizes heat transfer between the oil film and the sample conducted through the transfer tube.

OBJECTS

It is therefore an object of the present invention to provide continuous flow centrifuge apparatus.

It is a further object of the present invention to provide apparatus for minimizing heat transfer from a vacuum bushing to a sample in a continuous flow centrifuge apparatus.

It is a still further object of the present invention to provide continuous flow centrifuge apparatus for use with biological samples which are adversely affected by high temperatures.

It is another object of the present invention to provide continuous flow centrifuge apparatus including means for isolating the sample transfer tube from the vacuum bushing through which it passes.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

Figure 1:
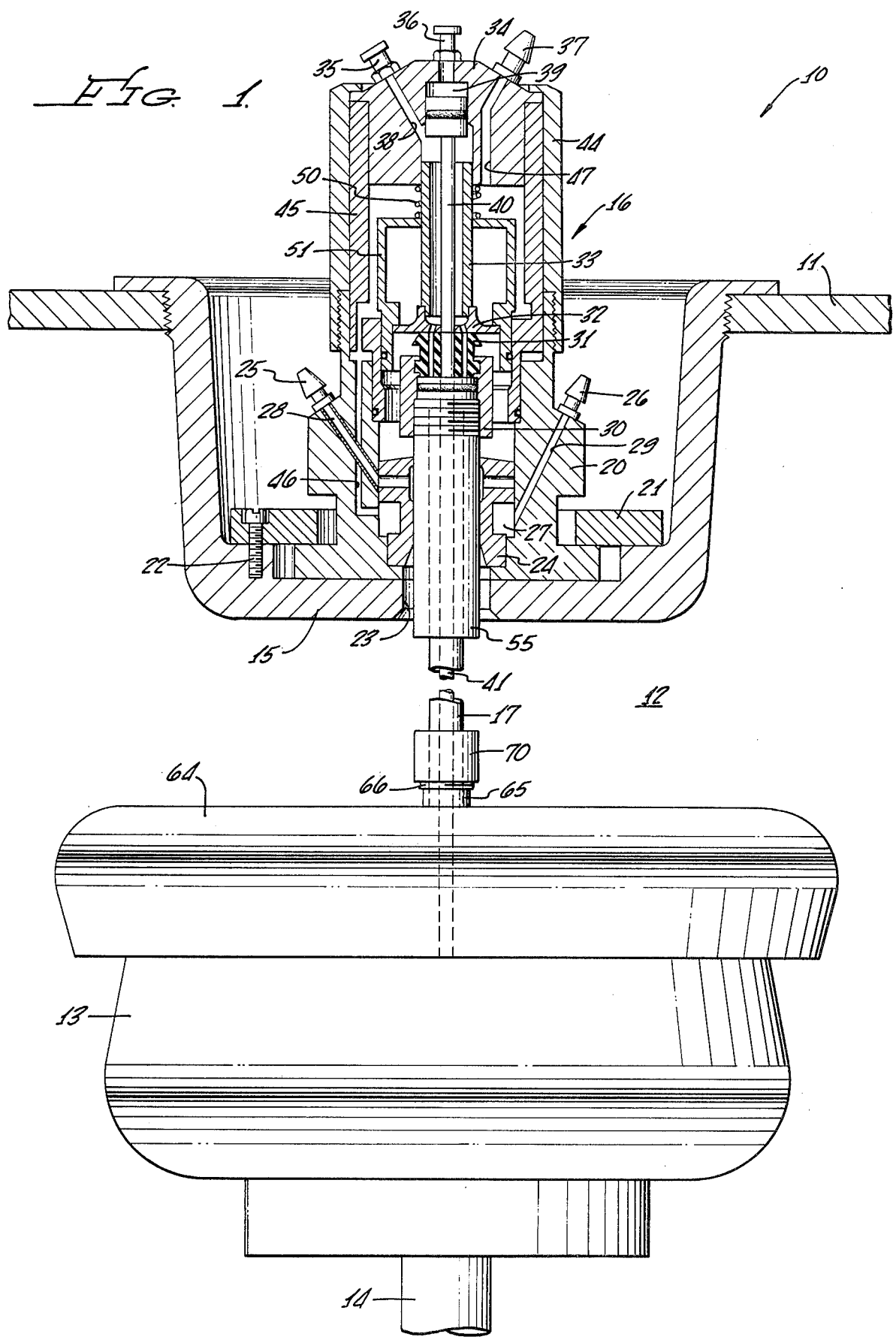
FIG. 1 is a partial, longitudinal sectional view of a continuous flow centrifuge apparatus of a conventional type showing the present improvement therein.

Referring now to the drawings and, more particularly, to FIG. 1 thereof, a convention continuous flow centrifuge apparatus, generally designated 10, of a type manufactured by Beckman Instruments, Inc., the assignee of the present application, includes an outer housing 11 which defines a chamber 12, housing 11 serving to enclose a rotor 13. The bottom of rotor 13 includes a socket (not shown), for receipt of one end of a drive shaft 14, which is driven by a drive means (not shown). The upper end of housing 11 has an opening therein for receipt of a cup-shaped adapter 15 which supports an inlet/outlet assembly, generally designated 16. Inlet/outlet assembly 16 conducts a sample solution to and from a rotary transfer tube 17 which is connected to rotor 13 for conducting the sample solution to the rotor cavity therein.

Typically, in continuous flow centrifugation, a sample solution is continuously pumped, via transfer tube 17, into the rotor cavity within rotor 13. During centrifugation, rotor 13 is driven at a high speed which causes the particles of interest to disperse in a radial direction throughout the density gradient solution. To prevent the heating of the outer surface of rotor 13 due to friction between the outer surface thereof and the surrounding air, chamber 12 is evacuated so that rotor 13 operates in a vacuum. The interior of chamber 12 may be provided with refrigeration means which serves to control the temperature therein. For a fuller discussion of centrifuge apparatus generally and rotor 13, reference should be had to the beforementioned U.S. Pat. No. 3,498,531.

Inlet/outlet assembly 16 is generally conventional and includes a bearing housing 20 which is secured to the base of adapter 15 by means of a plate 21 which is secured to adapter 15 by one or more screws 22. Housing 20 is positioned coaxially with transfer tube 17 which enters thereinto, from the bottom thereof, through an opening 23 in adapter 15. Bearing housing 20 supports a vacuum bushing 24 which surrounds transfer tube 17. An oil inlet stub 25 conducts oil to bushing 24 via a passageway 28 in housing 20 for the creation of an oil film to provide the beforementioned vacuum seal around transfer tube 17. Housing 20 further includes a water inlet stub 26 for conducting water via a passageway 29 in housing 20 to a channel 27 surrounding vacuum bushing 24 for cooling of same.

After passing through bushing 24, the upper end of transfer tube 17 is connected to a generally cylindrical seal tube 30 which is connected to a rotating seal 31. The top surface of rotating seal 31 contacts a stationary seal 32 which conducts incoming and outgoing solutions to channels formed in the upper surface thereof, which solutions pass through rotating seal 31 and seal tube 30 to transfer tube 17. Stationary seal 32 is connected via a sleeve 33 to a manifold 34 having first, second, and third inlet/outlet stubs 35, 36, and 37. Stub 35 communicates via a passageway 38 with sleeve 33 for conducting sample solution to or from sleeve 33, stationary seal 32, rotating seal 31, seal tube 30, and transfer tube 17. Stub 36 communicates via a passageway 39 with a tube 40 positioned coaxial with and inside of sleeve 33 for conducting sample solution to a central opening in stationary seal 32 and through the center of rotating seal 31 and seal tube 30 to a second rotary transfer tube 41 positioned within transfer tube 17. Thus, stubs 35 and 36 and transfer tubes 17 and 41 comprise inlet and outlet flow paths for rotor 13.

Inlet/outlet assembly 16 further includes an outer collar 44, the lower end of which is connected to bearing housing 20 and the upper end of which contacts manifold 34. Positioned within collar 44 is a water jacket assembly 45. The water conducted to channel 27 from water inlet stub 26 passes through a passageway 46 in housing 20 to water jacket assembly 45 where it is conducted via a second passageway 47 in manifold 34 to stub 37.

The remaining portions of inlet/outlet assembly 16 comprise a spring 50 positioned between the lower end of manifold 34 and the upper end of a hollow, generally cylindrical sleeve 51 which contacts stationary seal 32 and urges the lower surface thereof into contact with the upper surface of rotating seal 31 to form a fluid-tight seal therebetween. Inlet/outlet assembly 16 also includes a plurality of O-ring seal members positioned as shown, to provide suitable fluid-tight seals between the various elements of assembly 16.

Heretofore, the inner surface of vacuum bushing 24 was directly adjacent the outer surface of transfer tube 17 with the interface being lubricated by oil from inlet stub 25, thereby creating a vacuum seal between the upper and lower ends of bushing 24. Because of the extremely high speeds involved in centrifugation, this oil film is heated substantially and a continuous flow water cooling system from inlet 26 to outlet 37 is provided for dissipating the heat transferred from the oil film to bushing 24. Unfortunately, the heat generated within the oil film was also transferred to transfer tube 17 and this caused heating of transfer tube 17 as well as heating of the sample solution flowing therethrough. With the present improvement, this heating is greatly reduced.

Figure 2:
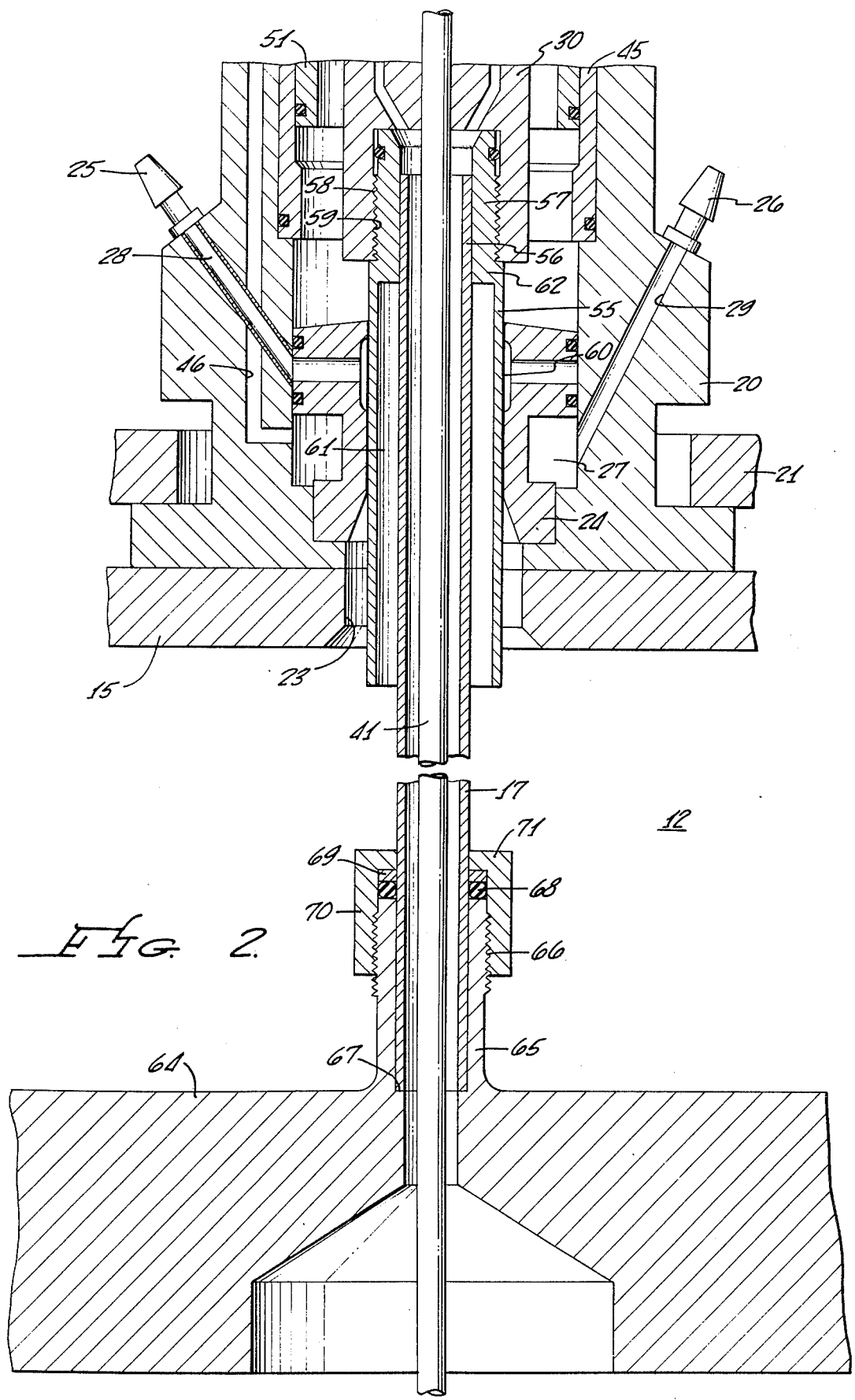
FIG. 2 is an enlarged longitudinal sectional view of a portion of the apparatus of FIG. 1 showing the apparatus for minimizing heat transfer between the vacuum bushing and the rotary transfer tube.

More specifically, and with reference to FIG. 2, apparatus 10 includes an elongate, cylindrical sleeve 55 surrounding, spaced from, and coaxial with transfer tube 17, adjacent the upper end 56 thereof. The upper end of sleeve 55 includes an integral stem 57 having an inner diameter which is approximately equal to the outer diameter of transfer tube 17. Upper end 56 of transfer tube 17 extends into stem 57 and may be connected thereto by a press fit or brazing along the interface. The outer surface of stem 57 is threaded, at 58, for connection to internal threads 59 in seal tube 30.

Vacuum bushing 24 now surrounds sleeve 55 and the vacuum seal interface is defined by the outer surface of sleeve 55 and the inner surface of vacuum bushing 24, this interface being lubricated by a film of oil 60 derived from inlet stub 25. Sleeve 55, having an inner diameter which is greater than the outer diameter of transfer tube 17, defines an annulus 61 between sleeve 55 and transfer tube 17 and this annular area 61 is in a vacuum. Accordingly, heat transfer from oil film 60 to transfer tube 17 is primarily through radiation across annulus 61 which permits an extremely low level of heat transfer. An additional area for heat transfer is via the insection between stem 57 and sleeve 55, at 62, and this is an extremely small area and conducts a relatively small amount of heat.

Cover 64 of rotor 13 has an integral collar or extension 65 which is externally threaded, at 66. Extension 65 has an inside diameter which is approximately equal to the outside diameter of transfer tube 17 for receipt thereof. The lower end of transfer tube 17 contacts a lip 67 in collar 64. Torque to drive transfer tube 17 from rotor 13 is provided by an O-ring 68 and a back-up ring 69 positioned at the upper end of extension 65, surrounding transfer tube 17. An internally threaded hex nut 70 which engages threads 66 of extension 65 includes a collar 71 which engages backup ring 69, causing compression of back-up ring 69 and O-ring 68 as hex nut 70 is tightened onto extension 65.

The driving of rotor 13 via drive shaft 14 rotates transfer tube 17 and transfer tube 41 therein via the connection between transfer tube 17 and rotor cover 64. The upper end of transfer tube 17 is connected to stem 57, causing the rotation thereof and sleeve 55. The rotation of stem 57 also causes rotation of seal tube 30 and rotating seal 31. Vacuum bushing 24 surrounds sleeve 55, creating oil film 60, which forms a vacuum seal between rotor chamber 12 and inlet/outlet assembly 16.

During continuous flow centrifugation, a sample solution may be conducted to and from rotor 13 via stubs 35 and 36 and transfer tubes 17 and 41, transfer tube 17 and the sample solution therein being isolated from the heat of oil film 60 by sleeve 55. By reducing significantly the heat transfer from the vacuum sealing surface and the sample solution, apparatus 10 may be used with a wider variety of biological samples.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. In a continuous flow centrifuge apparatus including a housing defining a vacuum chamber, a rotor positioned in said vacuum chamber, a first rotary transfer tube and a second rotary transfer tube connected to said rotor for conducting a sample to and from said rotor, said second rotary transfer tube being coaxially aligned within said first rotary transfer tube, a stationary inlet/outlet assembly connected to said housing for conducting said sample to and from said first and second rotary transfer tubes, and a bushing surrounding said first transfer tube for creating an oil film to provide a vacuum seal around said first transfer tube, the improvement comprising:

an elongate, cylindrical sleeve surrounding, spaced from, and coaxial with said first transfer tube, adjacent the upper end thereof, positioned between said first transfer tube and said bushing to form a vacuum annulus between said first transfer tube and said sleeve, the upper end of said sleeve including a stem connected to said upper end of said first transfer tube, said oil film around said first transfer tube being created between said bushing and the outer surface of said sleeve whereby the vacuum annulus formed between the inner surface of said sleeve and the outer surface of said first transfer tube minimizes heat transfer between said oil film and said sample conducted through said first and second transfer tubes.

2. In a continuous flow centrifuge apparatus according to claim 1, the improvement wherein the inner diameter of said stem is approximately equal to the outer diameter of said first transfer tube for contacting therewith and connected thereto.

3. In a continuous flow centrifuge apparatus according to claim 1, the improvement wherein the length of said stem is substantially less than the length of said sleeve to minimize the contact area between said sleeve/stem and said first transfer tube.

4. In a continuous flow centrifuge apparatus according to claim 1, the improvement wherein the cross-sectional area of the intersection between said sleeve and said stem is relatively small to minimize heat transfer between said sleeve and said stem.

* * * * *